US012743706B2

(12) United States Patent
Zhang et al.

(10) Patent No.: US 12,743,706 B2
(45) Date of Patent: Sep. 22, 2026

(54) MANAGEMENT SYSTEM FOR AUTOMATIC DETERMINATION OF ANOMALY BEHAVIOR FOR USER OF A SMART SHOPPING CART

(71) Applicant: Maplebear Inc., San Francisco, CA (US)

(72) Inventors: Ruoruo Zhang, Santa Clara, CA (US); Christopher Benjamin, Larchmont, NY (US); Michael Sandare, New York, NY (US); Lin Gao, Miami, FL (US); Graham Beauregard, Burlington (CA)

(73) Assignee: Maplebear Inc, San Francisco, CA (US)

(*) Notice: Subject to any disclaimer, the term of this patent is extended or adjusted under 35 U.S.C. 154(b) by 254 days.

(21) Appl. No.: 18/240,301

(22) Filed: Aug. 30, 2023

(65) Prior Publication Data

US 2025/0078098 A1 Mar. 6, 2025

(51) Int. Cl.
*G06Q 20/20* (2012.01)
*G06Q 30/018* (2023.01)

(52) U.S. Cl.
CPC ....... *G06Q 30/0185* (2013.01); *G06Q 20/208* (2013.01)

(58) Field of Classification Search
CPC .. G06Q 30/0185; G06Q 20/208; G06Q 10/08; G06Q 30/0603; G06Q 30/0613;
(Continued)

(56) References Cited

U.S. PATENT DOCUMENTS 9,911,290 B1 * 3/2018 Zalewski .............. H04W 76/10
10,282,852 B1 * 5/2019 Buibas .................... G06T 7/246
(Continued)

FOREIGN PATENT DOCUMENTS

EP 4047550 A1 * 8/2022 ........... G06T 7/0004
WO WO-2021110789 A1 * 6/2021 ............ G08B 13/22

OTHER PUBLICATIONS

Raskin, R. (2019). ShopTalk 2019 Takeaways: The customer journey is zigging & zagging through retail. TWICE: This Week in Consumer Electronics, 34(5), N.PAG. (Year: 2019).*
(Continued)

*Primary Examiner* — Ashford S Hayles
(74) *Attorney, Agent, or Firm* — Fenwick & West LLP

(57) ABSTRACT

A computer system for predicting an anomaly behavior (fraudulent behavior) for a user of a smart shopping cart (physical receptacle). The computer system gathers data associated with a physical activity of the user, the user being physically present at a location of a retailer and adding one or more items from the location of the retailer to the physical receptacle. The computer system applies a computer model to detect, based on the gathered data, one or more anomalies during the physical activity of the user, the one or more anomalies being indicative of the fraudulent behavior. In response to determining that the one or more detected anomalies satisfy a threshold condition for the fraudulent behavior, the computer system sends a communication to a management system of the retailer to cause at least one remedial action to be performed before the user physically leaves the location of the retailer.

18 Claims, 4 Drawing Sheets

(58) Field of Classification Search
CPC .. G06Q 30/0633; G06Q 20/18; G07G 1/0036; G07G 1/0045; G07G 3/003; B62B 5/0096; G06V 20/52
See application file for complete search history.

(56) References Cited

U.S. PATENT DOCUMENTS 11,403,682 B2 * 8/2022 Ramakrishnan ... G06Q 20/4016
11,568,400 B2 * 1/2023 Sundararaman ...... G06T 7/0002
12,033,481 B2 * 7/2024 Ramanathan .... G08B 13/19613
12,039,615 B2 * 7/2024 Sundararaman ....... G06Q 40/12
12,182,850 B2 * 12/2024 Rajappan ............... G06N 20/00
2006/0065717 A1 3/2006 Hurwitz et al.
2010/0228580 A1 * 9/2010 Zoldi ..................... G06Q 40/12 707/E17.014
2011/0051992 A1 * 3/2011 Cobb ..................... G06V 20/52 382/100
2011/0295704 A1 * 12/2011 Edwards ................ G06Q 30/06 705/16
2012/0296751 A1 * 11/2012 Napper ................ G06Q 20/208 705/23
2013/0284806 A1 10/2013 Margalit
2014/0222522 A1 * 8/2014 Chait ................. G06Q 10/0637 705/7.36
2015/0025969 A1 * 1/2015 Schroll ................ G06Q 20/208 705/14.64
2016/0110700 A1 * 4/2016 Brosnan ............... G07G 1/0054 705/22
2017/0083887 A1 * 3/2017 Volta .................... G06Q 20/203
2018/0068291 A1 * 3/2018 Kakino ................ G06Q 20/208
2018/0096261 A1 * 4/2018 Chu ....................... G06N 20/20
2019/0251776 A1 8/2019 Adelberg et al.
2019/0279185 A1 * 9/2019 Cheng ................... B62B 5/0096
2019/0286942 A1 * 9/2019 Abhiram .................. G06N 3/08
2019/0318417 A1 * 10/2019 Gumaru ............. G06Q 30/0635
2019/0362299 A1 * 11/2019 Chan .................. G06Q 20/3224
2020/0079412 A1 * 3/2020 Ramanathan .... G08B 13/19613
2020/0118400 A1 * 4/2020 Zalewski .............. H04W 76/14
2020/0279310 A1 * 9/2020 Kundu ................. G07G 1/0036
2021/0042509 A1 * 2/2021 Valiulla .................. G06N 20/00
2021/0049575 A1 * 2/2021 Widmaier ............... A47F 9/047
2021/0049606 A1 * 2/2021 Garcia .................. G06F 18/214
2021/0065190 A1 * 3/2021 Laserson .............. G07G 1/0054
2021/0142126 A1 * 5/2021 Warrick, II ............ G06N 20/10
2021/0174366 A1 * 6/2021 Zeng .................. G06Q 20/4016
2021/0287013 A1 * 9/2021 Carter .................. G06N 3/0464
2021/0406917 A1 * 12/2021 Erickson ............. G06F 16/9024
2022/0019988 A1 * 1/2022 Chilukuri ............... G06Q 20/32
2022/0122429 A1 * 4/2022 Ciprian Petru ..... G06F 18/2431
2022/0129785 A1 * 4/2022 Vogeti .................... G06N 20/00
2022/0171995 A1 * 6/2022 Balasubramanian .. G06N 20/00
2022/0172342 A1 * 6/2022 Zepeda Salvatierra ...................... G06V 10/70
2022/0198550 A1 * 6/2022 Meidar .................. G06Q 20/20
2022/0245643 A1 * 8/2022 Venkatasubramaniam .................. G06N 5/01
2023/0004978 A1 * 1/2023 Brakob .............. G06Q 20/4016
2023/0005348 A1 * 1/2023 Letierce ............... G07G 1/0036
2023/0034988 A1 * 2/2023 Suzuki ................... G06V 20/52
2023/0143479 A1 * 5/2023 Hagen ....................... G06T 7/11 345/420
2023/0169550 A1 * 6/2023 Oguchi .............. G06Q 30/0283
2024/0119512 A1 * 4/2024 Musiani ................. G06V 20/52
2024/0211965 A1 * 6/2024 Hosseinali ......... G06Q 30/0185
2024/0211966 A1 * 6/2024 Hosseinali ......... G06Q 30/0185
2024/0249342 A1 * 7/2024 Malgarini .......... G06Q 30/0633
2025/0232360 A1 * 7/2025 K.Rajappan ......... G06Q 20/208

OTHER PUBLICATIONS

PCT International Search Report and Written Opinion, PCT Application No. PCT/US24/35373, Sep. 19, 2024, 12 pages.

* cited by examiner

Smart Shopping Cart
150

MANAGEMENT SYSTEM FOR AUTOMATIC DETERMINATION OF ANOMALY BEHAVIOR FOR USER OF A SMART SHOPPING CART

BACKGROUND

Online systems, such as online concierge systems, provide for physical in-store smart shopping carts that allow users to physically add items from a store and check out without any involvement of store employees. The use of in-store smart shopping carts is convenient, but it also enables new ways for people to steal from the store by trying to trick the cart. Therefore, it is desirable to have a management system that automatically determines if someone is stealing items from the store when using an in-store smart shopping cart.

SUMMARY

Embodiments of the present disclosure are directed to a management system that is configured to automatically determine if there is any anomalous behavior (i.e., fraudulent behavior) in relation to a user of an in-store smart shopping cart (or, more generally, a physical receptacle).

In accordance with one or more aspects of the disclosure, a computer system (e.g., at an online concierge system or separate from the online concierge system) gathers data associated with a physical activity of a user, the user being physically present at a location of a retailer and adding one or more items from the location of the retailer to a physical receptacle, the computer system attached to or otherwise in communication with the physical receptacle. The computer system accesses a computer model trained to detect a fraudulent behavior of the user associated with the physical activity. The computer system applies the computer model to detect, based on the gathered data, one or more anomalies during the physical activity of the user, the one or more anomalies being indicative of the fraudulent behavior. The computer system determines that the one or more detected anomalies satisfy a threshold condition for the fraudulent behavior. In response to determining that the one or more detected anomalies satisfy the threshold condition for the fraudulent behavior, the computer system sends a communication to a management system of the retailer to cause at least one remedial action to be performed before the user physically leaves the location of the retailer.

DETAILED DESCRIPTION

Figure 1:
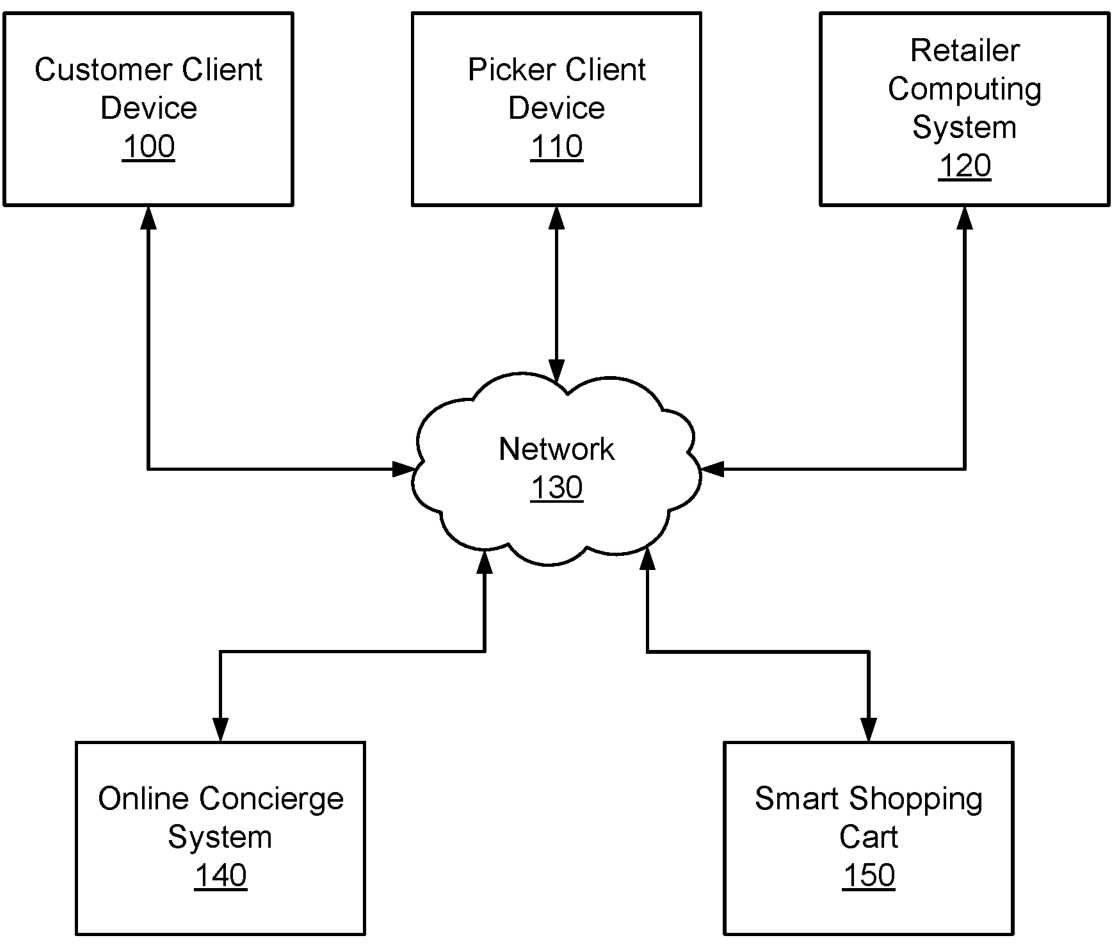
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, an online concierge system 140, and a smart shopping cart 150. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, so that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provide portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140.

The smart shopping cart 150 is an in-store shopping cart that enables a customer of the online concierge system 140 to physically add (i.e., place) items from a store into the smart shopping cart 150 and check them out from the store without an involvement of an employee of the store at the point of sale. The smart shopping cart 150 may be connected to the online concierge system 140 via the network 130. During the customer's shopping session, the smart shopping cart 150 may utilize various sensors (e.g., one or more weight sensors, one or more cameras, etc.) to gather data about the customer's activity, including, but not limited to, a location of the smart shopping cart 150 in the store, weight changes of items in a basket of the smart shopping cart 150, and video of the customer's activity in and around the smart shopping cart 150, etc. In some embodiments, the smart shopping cart 150 is considered being a part of the online concierge system 140. Note that the concepts described herein in relation to the smart shopping cart 150 can be extended/applied to other form factors, such as a handheld shopping basket, a handheld receptacle, or some other handheld object that can be used to store shopping items.

A management system of the online concierge system 140 that is connected to the smart shopping cart 150 via a network (e.g., the network 130) uses one or more machine-learning models and/or one or more rules modules to automatically detect one or more anomalies during the customer's shopping session, where the anomalies may be indicative of a fraud or theft by the customer. If the detected anomalies satisfy a threshold condition, a suspicious activity of the customer may be detected. In such a case, the online concierge system 140 flags the customer for an audit process, i.e., the online concierge system 140 triggers the audit process. The audit process may include a human in the loop (e.g., employee of the online concierge system 140) that audits over the network 130 the customer's activity. Alternatively or additionally, the audit process may include an in-store human reviewer (e.g., an in-store employee or security guard) who is tacked to ensure that a set of items paid for by the customer match items that the customer is attempting to remove from the store's premises. Upon flagging the customer for the audit process, the management system may trigger a security alert that dispatches the in-store human reviewer and locks the smart shopping cart 150 thus blocking the customer from checking out. Alternatively, the management system may be fully integrated into the smart shopping cart 150 and connected to the online concierge system 140 via the network 130. More details about the presented approach for automatically detecting an anomaly (i.e., fraud) that involves the smart shopping cart 150 are described in relation to FIGS. 2 through 4.

Figure 2:
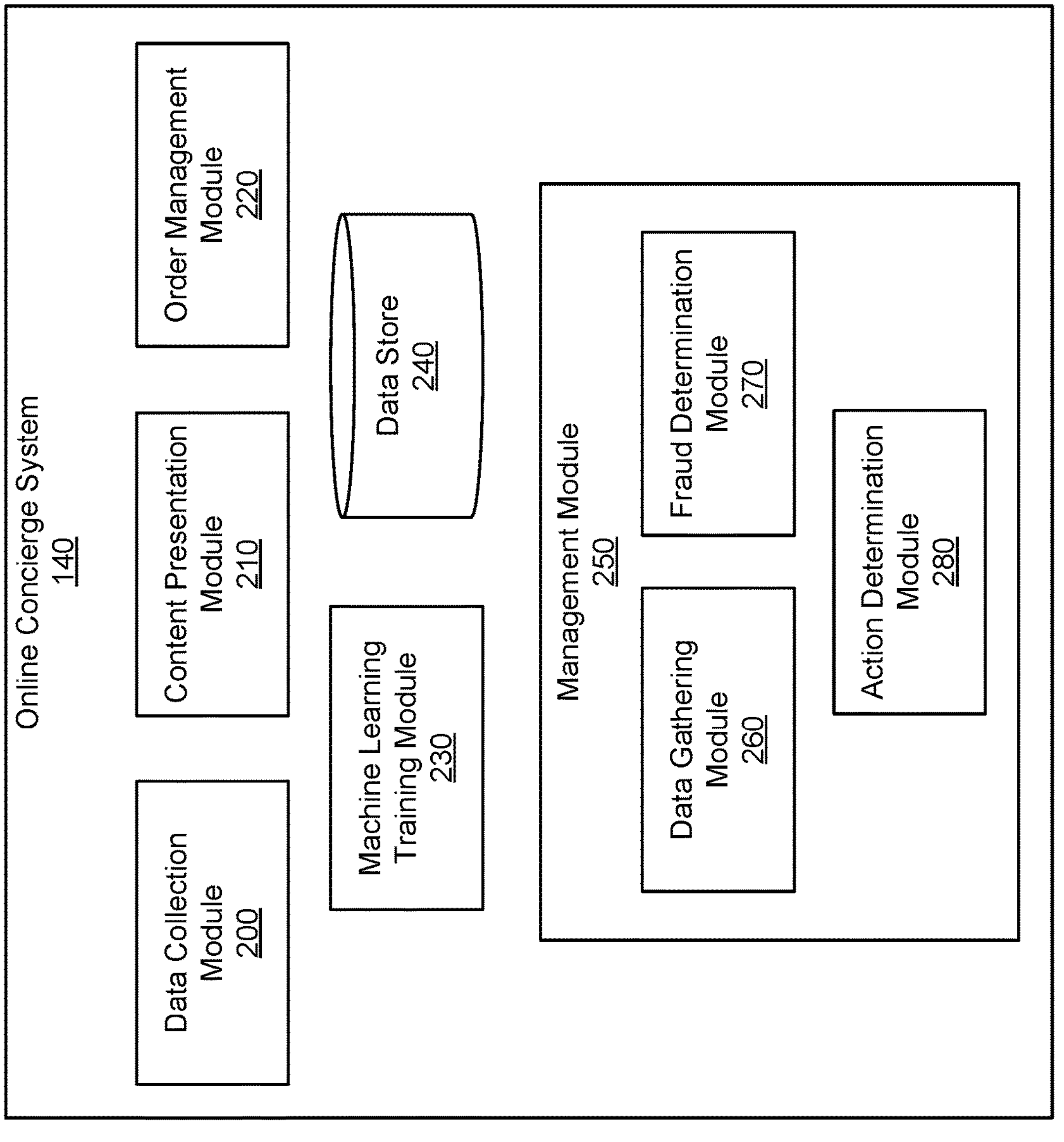
FIG. 2 illustrates an example system architecture for an online concierge system, in accordance with one or more embodiments.

FIG. 2 illustrates an example system architecture for the online concierge system 140, in accordance with some embodiments. The system architecture illustrated in FIG. 2 includes a data collection module 200, a content presentation module 210, an order management module 220, a machine-learning training module 230, a data store 240, and a management module 250. The management module 250 includes a data gathering module 260, a fraud determination module 270, and an action determination module 280. In some embodiments, the management module 250 may not be part of the online concierge system 140 but instead part of a computer system fully integrated at the smart shopping cart 150 and connected to the online concierge system 140 via the network 130. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of the order. In some embodiments, the order management module 220 computes an estimated time of arrival of the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross-entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

Figure 3:
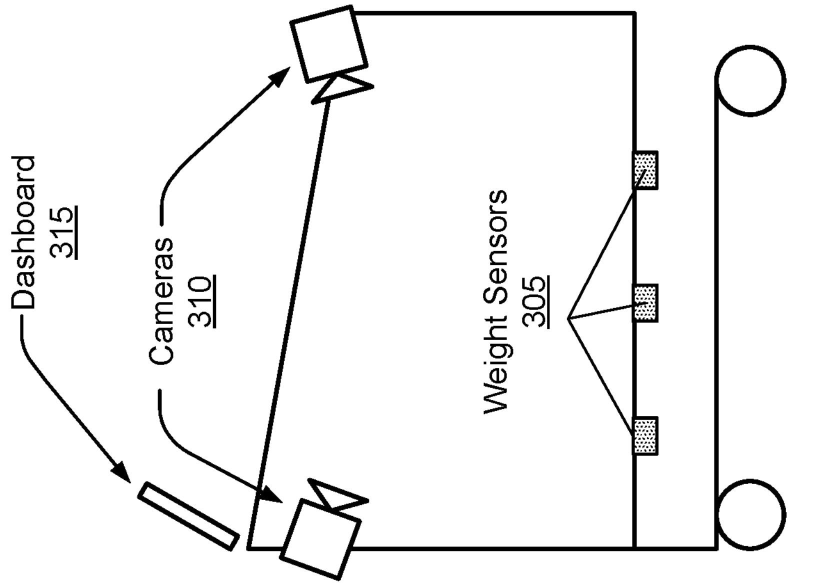
FIG. 3 illustrates an example smart shopping cart associated with an online concierge system, in accordance with one or more embodiments.

The management module 250 manages operations of the smart shopping cart 150 and communications between the online concierge system 140 and the smart shopping cart 150. The management module 250 uses a computer model and one or more modules to automatically detect one or more anomalies during a customer's shopping session, where the anomalies may be indicative of a fraud or theft by the customer that involves the smart shopping cart 150. When the one or more anomalies are detected, the management module 250 triggers an audit process that is conducted either remotely (e.g., at the online concierge system 140) or at a store where the customer is using the smart shopping cart 150. Upon conducting the audit process, the management module 250 may perform one or more remedial actions, such as automatically blocking the customer from checking out at the store using the smart shopping cart 150. FIG. 3 illustrates an example smart shopping cart 150 associated with the online concierge system 140, in accordance with one or more embodiments.

The data gathering module 260 of the management module 250 gathers data as a customer is shopping at a location of a retailer (e.g., grocery store) using the smart shopping cart 150. For example, the customer would scan items via the smart shopping cart 150 (i.e., providing information to the smart shopping cart 150 which items they are adding to the smart shopping cart 150). Alternatively or additionally, the customer would scan one or more items via an application of the customer client device 100 that is connected to the smart shopping cart 150 via the network 130. The smart shopping cart 150 may be equipped with one or more weight sensors 305 that measure weights of items placed in the smart shopping cart 150. Alternatively or additionally, the smart shopping cart 150 may have one or more cameras 310 that collect video data and/or image data in relation to items placed in the smart shopping cart 150, such as a weight of each item as indicated in an item label, a brand of each item, a price of each item, etc. Alternatively or additionally, the one or more cameras 310 may collect video data and/or image data in relation to actions in and around the smart shopping cart 150, such as a location of the smart shopping cart 150 cart in the store when a certain action occurs (e.g., when an item is added to the cart), customer's gestures when placing items in the smart shopping cart 150, video and/or images of customer's interactions with the smart shopping cart 150, etc. The smart shopping cart 150 may include additional sensors not shown in FIG. 3. Data gathered by various sensors of the smart shopping cart 150 may be uploaded via the network 130 to the data gathering module 260. The data gathering module 260 may send the gathered data to the fraud determination module 270 of the management module 250.

The fraud determination module 270 may apply a computer model trained to detect an anomaly behavior (i.e., fraudulent behavior) of the customer associated with the physical activity of shopping using the smart shopping cart 150. The trained computer model deployed by the fraud determination module 270 may run a machine-learning algorithm to detect, based on the gathered data obtained from the data gathering module 260, one or more anomalies detected during the customer's interaction with the smart shopping cart 150, where the one or more anomalies are indicative of the fraudulent behavior. The computer model may be a classification-based machine-learning model, summation-based machine-learning model, probabilistic machine-learning model, computer vision machine-learning model, reinforcement learning model, some other machine-learning model, or some combination thereof. A set of parameters for the computer model may be stored on one or more non-transitory computer-readable media of the fraud determination module 270. Alternatively or additionally, the set of parameters for the computer model may be stored on one or more non-transitory computer-readable media of the data store 240.

The fraud determination module 270 may provide one or more inputs to the computer model, where the one or more inputs may be based on the gathered data provided by the data gathering module 260. The one or more inputs to the computer model may include information about a location of the smart shopping cart 150 at a store of the retailer, information about a weight of a basket of the smart shopping cart 150 (i.e., weight of a load cell of the smart shopping cart 150) as obtained by the one or more weight sensors 305, information about one or more scanned items, information about customer's identification and/or loyalty membership, video data and/or image data captured by the one or more cameras 310 mounted on the smart shopping cart 150, or some other information about the customer's interaction with the smart shopping cart 150. The fraud determination module 270 may further utilize the captured video data and/or the image data to detect various postures of the customer that can be used to infer intents of the customer during the customer's interaction with the smart shopping cart 150, especially when an item is reportedly added to the smart shopping cart 150. Information about the inferred intents of the customer may be also input to the computer model. Furthermore, since the location of the smart shopping cart 150 in the store is known, the fraud determination module 270 may determine whether an item that was reported as added to the smart shopping cart 150 is obtainable from that location in the store. This information may be also added by the fraud determination module 270 as an input to the computer model.

Additionally or alternatively, the one or more inputs to the computer model may be related to information about one or more audit issues (i.e., one or more anomalies) determined by the fraud determination module 270. Each audit issue as detected by the fraud determination module 270 may be due to a customer's error and/or fraudulent behavior while interacting with the smart shopping cart 150. Information about any audit issue may be visible in real time on, e.g., a dashboard 315 of the smart shopping cart 150 during a customer's shopping session. After an audit is concluded, the on-site personnel may have the ability to clear audit issues/customer errors in real time during the customer's shopping session on the dashboard 315.

One audit issue detected by the fraud determination module 270 may be related to one or more personal item additions, i.e., one or more items may be added by staff and marked as one or more customer's personal items. The personal item addition may often be a false positive audit issue, e.g., when the customer puts a purse or some other personal item in the smart shopping cart 150. In such cases, the fraud determination module 270 (or some other module of the management module 250) may send an inquiry to the customer if the customer added a personal item to the smart shopping cart 150. If the customer confirms placement of the personal item to the smart shopping cart 150, the fraud determination module 270 (or some other module of the management module 250) may track that personal item and its weight going forward during the customer's shopping session.

Another audit issue detected by the fraud determination module 270 may be related to one or more unknown item additions, i.e., one or more load cell changes may be measured at the smart shopping cart 150 as a weight increase that is not related to item scan(s). In other words, the fraud determination module 270 may monitor and detect weight changes (e.g., based on data obtained from the data gathering module 260) at the smart shopping cart 150 that occur when no item is scanned. A yet another audit issue detected by the fraud determination module 270 may be related to one or more unknown item removals, i.e., one or more load cell changes may be measured at the smart shopping cart 150 as a weight decrease that is not related to item scan(s). A yet another audit issue detected by the fraud determination module 270 may be related to one or more weight mismatch additions, i.e., one or more load cell changes may be measured at the smart shopping cart 150 as a weight increase that is higher than an expected weight of an item retrieved from an item weight database (e.g., as available at the data store 240). In such cases, the fraud determination module 270 may analyze a weight mismatch between a weight change of the smart shopping cart 150 and a weight of an item that was reported as scanned. Alternatively or additionally, the fraud determination module 270 may compare a final weight of the smart shopping cart 150 at the checkout with a total weight of items that are reported to be in the smart shopping cart 150. A yet another audit issue detected by the fraud determination module 270 may be related to one or more weight mismatch removals, i.e., one or more load cell changes may be measured at the smart shopping cart 150 as a weight decrease that is higher than an expected weight of an item retrieved from the item weight database.

A yet another audit issue detected by the fraud determination module 270 may be related to one or more restricted item additions that can be due to: age restriction, security restriction, and/or quantity restriction. In the case of age restriction, one or more items may be added to the smart shopping cart 150 (e.g., alcohol, tobacco, etc.) that require in-store staff intervention and/or customer's identification. The fraud determination module 270 may check if an item being scanned has an age limit, and, if the age limit for the item is detected, the fraud determination module 270 may compare the age limit for the item with an age of the customer available from a customer's profile. In such cases, the fraud determination module 270 effectively detects if underage customers have added alcohol or other items with minimum age requirements into the smart shopping cart 150. In the case of security restriction, one or more items may be added to the smart shopping cart 150 (e.g., pharmaceuticals) that require a security tag to be removed by in-store staff. In such cases, the fraud determination module 270 may effectively flag certain problematic items (e.g., tide pods). In the case of quantity restriction, one or more items may be added to the smart shopping cart 150 that are limited by quantity. A yet another audit issue detected by the fraud determination module 270 may be related to a mandatory audit flag that represents a staff-enabled flag that forces a mandatory audit to be created for the customer's shopping activity that involves the smart shopping cart 150. The mandatory audit flag may be triggered by the in-store staff pressing a flag button on a management application of the online concierge system 140, which blocks the customer from checking out until being checked by the in-store staff.

The computer model deployed by the fraud determination module 270 may generate one or more outputs. The one or more outputs generated by the computer model may include information about one or more anomalies in relation to the customer's interactions with the smart shopping cart 150. In one or more embodiments, the one or more outputs of the computer model include a probability score of a likelihood of a shrink at the store caused by the customer's interactions with the smart shopping cart 150. Alternatively or additionally, the one or more outputs of the computer model may include a numeric score for each input to the computer model, such as a numeric score for each audit issue that was input to the computer model. Alternatively or additionally, the one or more outputs of the computer model may include an indication of whether each audit issue is correctly detected and identified. Alternatively or additionally, the one or more outputs of the computer model may include a classification of customer's interactions with the smart shopping cart 150 based on video data and/or image data input to the computer model. Alternatively or additionally, the one or more outputs of the computer model may include a classification of a customer who interacted with the smart shopping cart 150. The fraud determination module 270 may pass the one or more outputs of the computer model (e.g., information about the one or more detected anomalies) to the action determination module 280 of the management module 250.

The action determination module 280 may determine whether the one or more detected anomalies satisfy a threshold condition for the fraudulent behavior. If the one or more detected anomalies satisfy the threshold condition, the action determination module 280 may determine at least one remedial action to be performed. In one or more embodiments, the action determination module 280 determines whether to conduct an audit in relation to the customer's interaction with the smart shopping cart 150, based on the one or more detected anomalies and the threshold condition for the fraudulent behavior. The action determination module 280 may determine that a detected anomaly is a first one detected for a specific customer. In such cases, the action determination module 280 may not trigger an audit. The action determination module 280 may trigger an audit when a score associated with the one or more detected anomalies (e.g., as provided by the fraud determination module 270) is more than the threshold. In one or more embodiments, the score associated with the one or more detected anomalies may relate to a number of anomalies (e.g., as counted by the fraud determination module 270). In one or more other embodiments, the score associated with the one or more detected anomalies may relate to a cost or value associated with the potential loss caused by the fraudulent behavior of the customer (e.g., as determined by the fraud determination module 270). In general, the score associated with the one or more detected anomalies may be associated with a confidence or probability of the one or more detected anomalies being associated with the fraud and/or theft.

The action determination module 280 may set the threshold for the fraudulent behavior. In general, the threshold can vary based on various factors. In one or more embodiments, the action determination module 280 may set the threshold that is suitable for a particular customer, e.g., based on the customer's history and the customer's past risky behavior (if any). Alternatively or additionally, the action determination module 280 may set the threshold that depends on a store where a potential fraud/theft occurred. The action determination module 280 may set the threshold based on a probability of fraud/theft associated with the store, which depends on, e.g., whether the store is a high value store, whether the store is in a high crime area, etc. Alternatively or additionally, the action determination module 280 may set the threshold based at least in part on a total value of items that were reported to be included in a basket of the smart shopping cart 150. In some embodiments, a retailer associated with a store can assist in setting the threshold for the fraudulent behavior.

In one or more embodiments, a human is included in the loop to assist in determining whether an audit is required in relation to the customer's interaction with the smart shopping cart. The action determination module 280 may send a signal to an online human auditor (e.g., associated with the online concierge system 140 or with a management system of the retailer) asking the online human auditor to confirm whether to trigger an in-store audit. Additionally or alternatively, the action determination module 280 may send a signal to the online human auditor asking him/her to confirm each detected anomaly in relation to the customer's interaction with the smart shopping cart 150.

The action determination module 280 may send a signal to a human auditor in a store requesting that a customer passes by the human auditor before the customer can leave the store with purchased items. In such a case, the customer cannot perform the checkout using the smart shopping cart 150 until the human auditor in the store conducts an audit of the smart shopping cart and "clears" a basket of the smart shopping cart 150. Alternatively or additionally, the action determination module 280 may initiate a first pass of a remote audit (e.g., by an online human auditor) before triggering an in-store audit. The action determination module 280 may further determine whether any remedial action is required in addition to conducting an audit. In one or more embodiments, when the action determination module 280 determines that a score of one or more detected anomalies in relation to the customer's interaction with the smart shopping cart 150 satisfy a threshold condition for the fraudulent behavior, the action determination module 280 may send a signal that automatically blocks the customer from using the smart shopping cart 150 for checkout. In one or more embodiments, when an audit process "clears" the customer and the action determination module 280 allows the customer to check out using the smart shopping cart 150, the action determination module 280 may also determine whether the customer's interaction with the smart shopping cart 150 caused an error in detecting an anomaly or if the error was falsely identified by one or more modules of the management module 250.

The machine-learning training module 230 may train (or, more generally, update) the computer model that is deployed by the fraud determination module 270. The machine-learning training module 230 may utilize training data (e.g., as available at the data store 240) to train the computer model. The training data may include information about past fraudulent behaviors in relation to past shopping sessions involving the smart shopping cart 150 that were detected over a defined time period. Alternatively or additionally, the training data may be associated with shopping session in a specific store and/or in one or more specific types of a store. The fraud determination module 270 (or some other module of the management module 250) may determine whether the one or more anomalies detected by the computer model were correct, and the fraud determination module 270 (or some other module of the management module 250) may generate training data based on this information. The fraud determination module 270 (or some other module of the management module 250) may pass the generated training data to the machine-learning training module 230, and the machine-learning training module 230 may retrain (or, more generally, update) the computer model using the generated training data.

The machine-learning training module 230 may retrain the computer model based on information about one or more decisions made by the fraud determination module 270 and/or the action determination module 280. The machine-learning training module 230 may retrain the computer model using data from previous shopping sessions involving the smart shopping cart 150. Additionally or alternatively, information about erroneous detection of one or more anomalies of the customer's interaction with the smart shopping cart 150 (e.g., as determined by the fraud determination module 270) may be used by the machine-learning training module 230 as counterfactual training data to retrain the computer model. The machine-learning training module 230 may use additional sensor and/or cart generated information (e.g., information about weight, location, items, errors, personalization data, etc.) to retrain the computer model. In one or more embodiments, the machine-learning training module 230 retrains the computer model in relation to classification of images in order to improve a computer vision feature of the computer model. The retrained computer model may adjust, e.g., scoring of anomalies detected in relation to the customer's interaction with the smart shopping cart 150. Alternatively or additionally, the retrained computer model may adjust one or more weights that were given to one or more inputs to the computer model.

Figure 4:
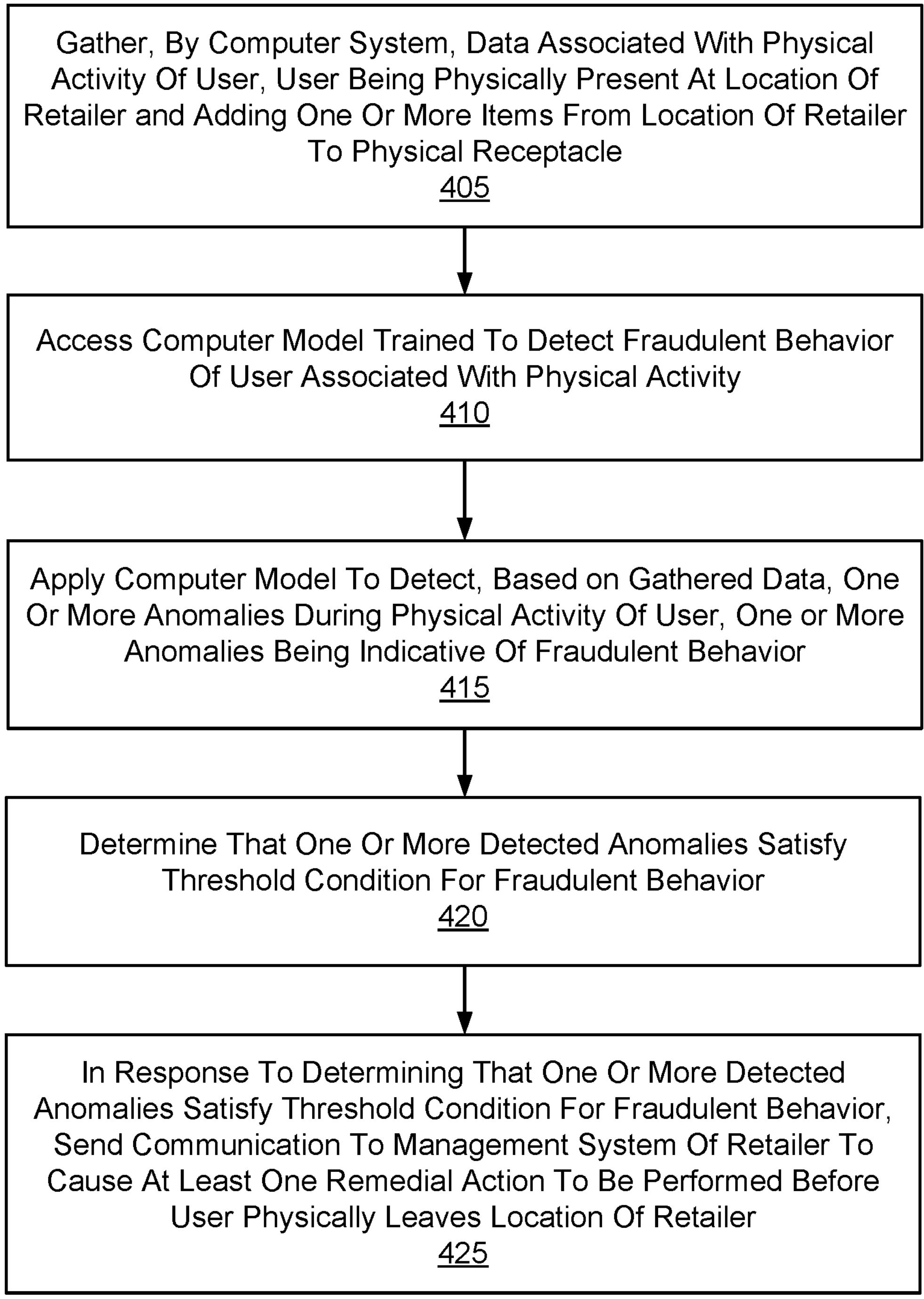
FIG. 4 is a flowchart of a method of using a management system to determine a fraudulent behavior for a user of a smart shopping cart, in accordance with one or more embodiments.

FIG. 4 is a flowchart of a method of using a management system to determine a fraudulent behavior for a user of a smart shopping cart, in accordance with one or more embodiments. Alternative embodiments may include more, fewer, or different steps from those illustrated in FIG. 4, and the steps may be performed in a different order from that illustrated in FIG. 4. These steps may be performed by a computer system that may be part of an online concierge system (e.g., the online concierge system 140) or separate from the online concierge system (e.g., fully integrated at the smart shopping cart 150 and connected to the online concierge system 140 via the network 130). Additionally, each of these steps may be performed automatically by the computer system without human intervention. In some embodiments, each of these steps is performed by a device of the user (e.g., the customer client device 100), which is used to scan one or more items at a location of a retailer (e.g., grocery store or warehouse).

The computer system gathers 405 (e.g., via the data gathering module 260) data associated with a physical activity of a user, the user being physically present at a location of a retailer and adding one or more items from the location of the retailer to a physical receptacle (e.g., the smart shopping cart 150). The computer system may be attached to or otherwise in communication with the physical receptacle (e.g., via the network 130). The gathered data may comprise at least one of: information about a location of the physical receptacle at the location of the retailer when each of the one or more items is added to the physical receptacle, one or more changes of weights associated with the one or more items, video data associated with an activity in the physical receptacle, or video data associated with an activity around the physical receptacle. The computer system may gather the data by measuring the one or more items when being added to the physical receptacle using at least one sensor mounted to the physical receptacle.

The computer system accesses 410 a computer model (e.g., via the fraud determination module 270) trained to detect a fraudulent behavior of the user associated with the physical activity. The computer system applies 415 the computer model (e.g., via the fraud determination module 270) to detect, based on the gathered data, one or more anomalies during the physical activity of the user, the one or more anomalies being indicative of the fraudulent behavior. The computer system may determine (e.g., via the fraud determination module 270) whether the one or more anomalies detected by the computer model were correct. The computer system may generate (e.g., via the fraud determination module 270) training data based on information whether the one or more detected anomalies were correct. The computer system may retrain the computer model (e.g., via the machine-learning training module 230) using the generated training data.

The computer system may apply the computer model (e.g., via the fraud determination module 270) to detect the one or more anomalies based on at least one of: one or more weight changes associated with the one or more items without a scanning performed for the one or more items by the user, or a weight mismatch between a weight change of the physical receptacle and a weight of an item being scanned by the user. The computer system may apply the computer model (e.g., via the fraud determination module 270) to detect an intent of the user based on the gathered data. The computer system may apply the computer model (e.g., via the fraud determination module 270) to detect the one or more anomalies based on the detected intent. The computer system may identify (e.g., via the data gathering module 260) at least one of the one or more items added to the physical receptacle or at least one item removed from the physical receptacle. The computer system may apply the computer model (e.g., via the fraud determination module 270) to detect the one or more anomalies based on identifying at least one of the one or more added items or the at least one removed item.

The computer system may generate (e.g., via the content presentation module 210) a message for the user, in response to the computer model detecting the one or more anomalies associated with an item added to the physical receptacle. Responsive to generating the message, the computer system may cause (e.g., via the content presentation module 210) a device of the user (e.g., the customer client device 100) to display a user interface with the message. The computer system may track (e.g., via the data gathering module 260 and/or the fraud determination module 270) a weight for the item of the user (e.g., user's personal item) added to the physical receptacle, based on the user responding to the message.

The computer system determines 420 (e.g., via the action determination module 280) that the one or more detected anomalies satisfy a threshold condition for the fraudulent behavior. The computer system may score (e.g., via the action determination module 280) each of the one or more anomalies to obtain a total score for the one or more anomalies. The computer system may determine (e.g., via the action determination module 280) that the one or more detected anomalies satisfy the threshold condition based on the total score being higher than a threshold score. The computer system may set (e.g., via the action determination module 280) the threshold condition for the fraudulent behavior based on at least one of: information about the user, a likelihood of the fraudulent behavior associated with the location of the retailer, a total monetary value of the one or more items added to the physical receptacle, or a defined threshold condition set by the retailer.

In response to determining that the one or more detected anomalies satisfy the threshold condition for the fraudulent behavior, the computer system sends 425 (e.g., via the action determination module 280) a communication to a management system of the retailer to cause at least one remedial action to be performed before the user physically leaves the location of the retailer. The computer system may flag (e.g., via the action determination module 280) the user for an audit process, based on determining that the one or more detected anomalies satisfy the threshold condition for the fraudulent behavior. The computer system may determine (e.g., via the action determination module 280), during the audit process, that a first set of items the user paid for does not match a second set of items the user is attempting to remove from the location of the retailer. The computer system may send (e.g., via the action determination module 280) the communication to the management system of the retailer to cause the at least one remedial action to be performed, based on determining that the first set of items does not match the second set of items. In response to flagging the user for the audit process, the computer system may trigger (e.g., via the action determination module 280) the audit process over a network (e.g., the network 130). The computer system may send (e.g., via the action determination module 280) a signal to a human reviewer at the location of the retailer to conduct the audit process at the location of the retailer, in response to flagging the user for the audit process.

Embodiments of the present disclosure are directed to a management system that is configured to automatically determine if there is an anomalous (i.e., fraudulent) behavior in relation to a customer that uses the smart shopping cart 150. The smart shopping cart 150 has a machine-learning capability (e.g., via a network connection with the online concierge system 140) capable to detect anomalies, as well as logic to trigger an in-store audit based on the detected anomalies.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:

gathering, by the computer system, data associated with a physical activity of a user, the user being physically present at a location of a retailer and adding a set of items to a physical receptacle, the computer system in communication with the physical receptacle, the data including information about one or more weight changes associated with one or more items of the set of items added to the physical receptacle without a scanning performed for the one or more items by the user;

accessing a machine-learning model trained to detect a fraudulent behavior of the user associated with the physical activity;

applying the machine-learning model to the gathered data including the information about the one or more weight changes associated with the one or more items added to the physical receptacle without the scanning to:

detect one or more anomalies during the physical activity of the user, the one or more anomalies being indicative of the fraudulent behavior, and generate a score for each of the one or more detected anomalies that is indicative of a likelihood that each of the one or more detected anomalies is associated with the fraudulent behavior;

generating, using the score for each of the one or more detected anomalies, a total score for the one or more detected anomalies;

determining, based on the total score being higher than a threshold score, that the one or more detected anomalies satisfy a threshold condition for the fraudulent behavior;

in response to determining that the one or more detected anomalies satisfy the threshold condition for the fraudulent behavior, sending a communication to a management system of the retailer to cause at least one remedial action to be performed before the user physically leaves the location of the retailer;

determining whether the one or more anomalies detected by the machine-learning model were correct;

generating training data based on information whether the one or more detected anomalies were correct; and retraining the machine-learning model using the generated training data.

2. The method of claim 1, wherein gathering the data further comprises gathering at least one of: information about a location of the physical receptacle at the location of the retailer when each item of the set of items is added to the physical receptacle, video data associated with an activity in the physical receptacle, or video data associated with an activity around the physical receptacle.

3. The method of claim 1, wherein gathering the data further comprises measuring each item of the set of items when being added to the physical receptacle using at least one sensor mounted to the physical receptacle.

4. The method of claim 1, wherein applying the machine-learning model comprises:

applying the machine-learning model further to information about a weight mismatch between a weight change of the physical receptacle and a weight of an item being scanned by the user to detect the one or more anomalies and generate the score for each of the one or more detected anomalies.

5. The method of claim 1, wherein applying the machine-learning model further comprises:

detecting an intent of the user based on the gathered data; and detecting the one or more anomalies based on the detected intent.

6. The method of claim 1, further comprising:

identifying at least one item of the set of items added to the physical receptacle or at least one item removed from the physical receptacle, wherein applying the machine-learning model further comprises applying the machine-learning model to detect the one or more anomalies based on identifying at least one of the at least one added item or the at least one removed item.

7. The method of claim 1, further comprising:

generating a message for the user, in response to the machine-learning model detecting the one or more anomalies associated with an item added to the physical receptacle;

responsive to generating the message, causing a device associated with the user to display a user interface with the message; and tracking a weight for the item added to the physical receptacle, based on the user responding to the message.

8. The method of claim 1, further comprising:

setting the threshold condition for the fraudulent behavior based on at least one of:

information about the user, a likelihood of the fraudulent behavior associated with the location of the retailer, a total monetary value of the one or more items added to the physical receptacle, or a defined threshold condition set by the retailer.

9. The method of claim 1, wherein sending the communication to the management system comprises:

flagging the user for an audit process, based on determining that the one or more detected anomalies satisfy the threshold condition for the fraudulent behavior.

10. The method of claim 9, wherein sending the communication to the management system further comprises:

determining, during the audit process, that a first set of items the user paid for does not match a second set of items the user is attempting to remove from the location of the retailer; and sending the communication to the management system to cause the at least one remedial action to be performed, based on determining that the first set of items does not match the second set of items.

11. The method of claim 9, wherein sending the communication to the management system further comprises:

triggering the audit process over a network, in response to flagging the user for the audit process.

12. The method of claim 9, wherein sending the communication to the management system further comprises:

sending a signal to a human reviewer at the location of the retailer to conduct the audit process at the location of the retailer, in response to flagging the user for the audit process.

13. A computer program product comprising a non-transitory computer readable storage medium having instructions encoded thereon that, when executed by a processor, cause the processor to perform steps comprising:

gathering, by a computer system, data associated with a physical activity of a user, the user being physically present at a location of a retailer and adding a set of items to a physical receptacle, the computer system in communication with the physical receptacle, the data including information about one or more weight changes associated with one or more items of the set of items added to the physical receptacle without a scanning performed for the one or more items by the user;

accessing a machine-learning model trained to detect a fraudulent behavior of the user associated with the physical activity;

applying the machine-learning model to the gathered data including the information about the one or more weight changes associated with the one or more items added to the physical receptacle without the scanning to:

detect one or more anomalies during the physical activity of the user, the one or more anomalies being indicative of the fraudulent behavior, and generate a score for each of the one or more detected anomalies that is indicative of a likelihood that each of the one or more detected anomalies is associated with the fraudulent behavior;

generating, using the score for each of the one or more detected anomalies, a total score for the one or more detected anomalies;

determining, based on the total score being higher than a threshold score, that the one or more detected anomalies satisfy a threshold condition for the fraudulent behavior;

in response to determining that the one or more detected anomalies satisfy the threshold condition for the fraudulent behavior, sending a communication to a management system of the retailer to cause at least one remedial action to be performed before the user physically leaves the location of the retailer;

determining whether the one or more anomalies detected by the machine-learning model were correct;

generating training data based on information whether the one or more detected anomalies were correct; and retraining the machine-learning model using the generated training data.

14. The computer program product of claim 13, wherein the instructions further cause the processor to perform steps comprising:

applying the machine-learning model further to information about a weight mismatch between a weight change of the physical receptacle and a weight of an item being scanned by the user to detect the one or more anomalies and generate the score for each of the one or more detected anomalies.

15. The computer program product of claim 13, wherein the instructions further cause the processor to perform steps comprising:

generating a message for the user, in response to the machine-learning model detecting the one or more anomalies associated with an item added to the physical receptacle;

responsive to generating the message, causing a device associated with the user to display a user interface with the message; and tracking a weight for the item added to the physical receptacle, based on the user responding to the message.

16. The computer program product of claim 13, wherein the instructions further cause the processor to perform steps comprising:

applying the machine-learning model to detect an intent of the user based on the gathered data; and applying the machine-learning model to detect the one or more anomalies based on the detected intent.

17. The computer program product of claim 13, wherein the instructions further cause the processor to perform steps comprising:

flagging the user for an audit process, based on determining that the one or more detected anomalies satisfy the threshold condition for the fraudulent behavior;

determining, during the audit process, that a first set of items the user paid for does not match a second set of items the user is attempting to remove from the location of the retailer; and sending the communication to the management system to cause the at least one remedial action to be performed, based on determining that the first set of items does not match the second set of items.

18. A computer system comprising:

a processor; and a non-transitory computer-readable storage medium having instructions that, when executed by the processor, cause the computer system to perform steps comprising:

gathering, by the computer system, data associated with a physical activity of a user, the user being physically present at a location of a retailer and adding a set of items to a physical receptacle, the computer system in communication with the physical receptacle, the data including information about one or more weight changes associated with one or more items of the set of items added to the physical receptacle without a scanning performed for the one or more items by the user;

accessing a machine-learning model trained to detect a fraudulent behavior of the user associated with the physical activity;

applying the machine-learning model to the gathered data including the information about the one or more weight changes associated with the one or more items added to the physical receptacle without the scanning to:

detect one or more anomalies during the physical activity of the user, the one or more anomalies being indicative of the fraudulent behavior, and generate a score for each of the one or more detected anomalies that is indicative of a likelihood that each of the one or more detected anomalies is associated with the fraudulent behavior;

generating, using the score for each of the one or more detected anomalies, a total score for the one or more detected anomalies;

determining, based on the total score being higher than a threshold score, that the one or more detected anomalies satisfy a threshold condition for the fraudulent behavior;

in response to determining that the one or more detected anomalies satisfy the threshold condition for the fraudulent behavior, sending a communication to a management system of the retailer to cause at least one remedial action to be performed before the user physically leaves the location of the retailer;

determining whether the one or more anomalies detected by the machine-learning model were correct;

generating training data based on information whether the one or more detected anomalies were correct; and retraining the machine-learning model using the generated training data.

* * * * *